United States Patent
Beele

(10) Patent No.: US 9,722,404 B2
(45) Date of Patent: Aug. 1, 2017

(54) SYSTEM FOR SEALINGLY HOLDING CABLES WHICH EXTEND THROUGH AN OPENING

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 14/768,053

(22) PCT Filed: Feb. 12, 2014

(86) PCT No.: PCT/EP2014/052708
§ 371 (c)(1),
(2) Date: Aug. 14, 2015

(87) PCT Pub. No.: WO2014/124956
PCT Pub. Date: Aug. 21, 2014

(65) Prior Publication Data
US 2016/0020592 A1   Jan. 21, 2016

(30) Foreign Application Priority Data

Feb. 14, 2013   (NL) ...................................... 2010304

(51) Int. Cl.
*F16L 5/00*   (2006.01)
*H02G 3/22*   (2006.01)
(Continued)

(52) U.S. Cl.
CPC .............. *H02G 3/22* (2013.01); *F16L 3/1058* (2013.01); *F16L 3/227* (2013.01); *F16L 5/10* (2013.01); *F16L 5/14* (2013.01)

(58) Field of Classification Search
USPC ........................................................ 248/56
See application file for complete search history.

(56) References Cited

U.S. PATENT DOCUMENTS 2,032,492 A   3/1936   Nathan
2,202,617 A   5/1940   Shook
(Continued)

FOREIGN PATENT DOCUMENTS

CA   2 325 183 A1   5/2001
CN   1147294 A   4/1997
(Continued)

OTHER PUBLICATIONS

International Search Report and Written Opinion mailed Sep. 15, 2015 for Application No. PCT/EP2014/052708.
(Continued)

*Primary Examiner* — Monica Millner
(74) *Attorney, Agent, or Firm* — Wolf, Greenfield & Sacks, P.C.

(57) ABSTRACT

The invention relates to a system for sealingly holding cables through an opening. The system comprises a holder substantially in the form of a plate having a central portion with a first thickness between a first side and a second side of the plate and a peripheral portion with a second thickness which is smaller than the first thickness, the holder having in the central portion a plurality of conduits extending in the thickness direction of the plate, each conduit being suitable for having one or more cables extending there through, at least one multi-part sealing plug of an elastic material for sealing an annular space between an inner wall of one of the conduits and a cable extending there through and a gasket of an elastic material and of a shape for placement against the peripheral portion so as to provide a sealing in a circumferential direction of the plate. The plug has at least one circumferentially extending outer rib and at least one circumferentially extending inner rib. In an uninserted state, the following conditions apply: the outer rib has a sawtooth shape for easy insertion, the sawtooth is provided with an
(Continued)

angled inward bend for facilitating flexing of the sawtooth in a transverse direction, the inner rib has a top surface extending in circumferential and longitudinal direction for facilitating sliding along the cable, and an imaginary straight line extending in a transverse direction coincides with a pivotal point of the angled bend and intersects the top surface.

16 Claims, 12 Drawing Sheets

(51) Int. Cl.
  *F16L 5/10* (2006.01)
  *F16L 5/14* (2006.01)
  *F16L 3/10* (2006.01)
  *F16L 3/227* (2006.01)

(56) References Cited

U.S. PATENT DOCUMENTS

| | | | |
|---|---|---|---|
| 2,271,777 A | 2/1942 | Nathan | |
| 2,354,919 A * | 8/1944 | Lockwood | F16L 3/2235 248/68.1 |
| 2,355,742 A * | 8/1944 | Morehouse | F16L 3/2235 174/40 CC |
| 2,396,836 A * | 3/1946 | Ellinwood | F16L 3/2235 174/135 |
| 2,404,531 A * | 7/1946 | Robertson | F16L 3/2235 138/106 |
| 2,448,769 A | 9/1948 | Chamberlain | |
| 2,819,099 A | 1/1958 | Rittle | |
| 2,896,974 A | 7/1959 | Bush | |
| 3,016,722 A | 1/1962 | Batdorf | |
| 3,048,415 A | 8/1962 | Shook | |
| 3,067,425 A | 12/1962 | Colley | |
| 3,162,412 A | 12/1964 | McEntire | |
| 3,163,448 A | 12/1964 | Carl | |
| 3,165,324 A | 1/1965 | Zopfi | |
| 3,206,539 A * | 9/1965 | Kelly | H02G 3/0658 174/117 R |
| 3,229,026 A * | 1/1966 | Sulzer | H02G 3/0616 16/2.1 |
| 3,331,914 A | 7/1967 | Kavinsky | |
| 3,352,212 A | 11/1967 | Read | |
| 3,489,440 A * | 1/1970 | Brattberg | F16L 3/2235 248/56 |
| 3,578,027 A | 5/1971 | Zopfi | |
| 3,580,988 A | 5/1971 | Orlowski et al. | |
| 3,702,193 A | 11/1972 | Flegel et al. | |
| 3,731,448 A | 5/1973 | Leo | |
| 3,793,672 A | 2/1974 | Wetmore | |
| 3,811,711 A | 5/1974 | Tarkenton | |
| 3,827,704 A | 8/1974 | Gillemot et al. | |
| 3,893,919 A | 7/1975 | Flegel et al. | |
| 3,913,928 A | 10/1975 | Yamaguchi | |
| 4,061,344 A * | 12/1977 | Bradley | E04B 1/947 174/151 |
| 4,075,803 A | 2/1978 | Alesi | |
| 4,086,736 A | 5/1978 | Landrigan | |
| 4,245,445 A * | 1/1981 | Heinen | F16L 5/02 174/481 |
| 4,293,138 A | 10/1981 | Swantee | |
| 4,361,721 A * | 11/1982 | Massey | H02G 15/013 174/653 |
| 4,376,230 A * | 3/1983 | Bargsten | H02G 3/22 174/505 |
| 4,385,777 A | 5/1983 | Logsdon | |
| 4,413,845 A | 11/1983 | Lawrence | |
| 4,419,535 A * | 12/1983 | O'Hara | H02G 3/22 169/48 |
| 4,426,095 A * | 1/1984 | Buttner | F16L 17/025 277/606 |
| 4,429,886 A | 2/1984 | Buttner | |
| 4,641,858 A | 2/1987 | Roux | |
| 4,664,421 A | 5/1987 | Jones | |
| 4,797,122 A | 1/1989 | Kuboi et al. | |
| 4,889,298 A * | 12/1989 | Hauff | F16L 5/08 174/503 |
| 4,915,422 A | 4/1990 | Chacon et al. | |
| 4,998,896 A | 3/1991 | Lundergan | |
| 5,020,810 A | 6/1991 | Jobe | |
| 5,027,571 A * | 7/1991 | Wolff | H02G 3/22 174/481 |
| 5,067,676 A * | 11/1991 | Beele | H02G 3/22 248/56 |
| 5,108,060 A * | 4/1992 | Beele | H02G 3/22 248/56 |
| 5,245,131 A * | 9/1993 | Golden | H02B 1/305 174/652 |
| 5,288,087 A * | 2/1994 | Bertoldo | H02G 3/06 277/616 |
| 5,344,106 A | 9/1994 | Beele | |
| 5,377,939 A * | 1/1995 | Kirma | F16B 7/048 24/543 |
| 5,456,050 A | 10/1995 | Ward | |
| 5,482,076 A * | 1/1996 | Taylor | F16L 55/134 137/318 |
| 5,493,068 A * | 2/1996 | Klein | H02G 3/22 174/151 |
| 5,611,706 A | 3/1997 | Makita et al. | |
| 5,649,712 A | 7/1997 | Ekholm | |
| 5,653,452 A | 8/1997 | Jarvenkyla | |
| 5,662,336 A | 9/1997 | Hayashi | |
| 5,927,725 A | 7/1999 | Tabata et al. | |
| 5,954,345 A | 9/1999 | Svoboda et al. | |
| 6,180,882 B1 * | 1/2001 | Dinh | H02G 3/22 16/2.2 |
| 6,259,033 B1 * | 7/2001 | Kassulat | H02G 3/088 174/151 |
| 6,343,412 B1 * | 2/2002 | Stephenson | F16L 55/128 138/98 |
| 6,359,224 B1 | 3/2002 | Beele | |
| 6,431,215 B1 * | 8/2002 | Hsu | F16L 7/02 138/108 |
| 6,494,463 B1 | 12/2002 | Rank | |
| 6,521,840 B1 * | 2/2003 | Kreutz | H02G 15/013 138/109 |
| 6,575,430 B1 | 6/2003 | Smith | |
| 6,634,675 B2 * | 10/2003 | Parkes | F16L 55/165 138/89 |
| 6,862,852 B1 | 3/2005 | Beele | |
| 6,902,138 B2 * | 6/2005 | Vantouroux | F16L 3/1091 248/68.1 |
| 6,969,799 B2 | 11/2005 | Snyder | |
| 7,005,579 B2 * | 2/2006 | Beele | F16L 5/10 16/2.1 |
| 7,249,971 B2 | 7/2007 | Burke et al. | |
| 7,288,730 B2 * | 10/2007 | Habel | H02G 3/22 16/2.1 |
| 7,299,823 B2 | 11/2007 | Smith | |
| 7,371,969 B2 * | 5/2008 | Hedstrom | F16L 5/08 174/151 |
| 7,410,174 B2 | 8/2008 | Jones et al. | |
| 7,781,684 B2 * | 8/2010 | Stuckmann | H02G 3/088 16/2.1 |
| 7,802,798 B2 * | 9/2010 | Beele | F16L 5/10 277/607 |
| 7,806,374 B1 * | 10/2010 | Ehmann | H02G 3/22 174/40 R |
| 7,918,486 B2 | 4/2011 | Preisndorfer | |
| 8,262,094 B2 * | 9/2012 | Beele | F16L 5/10 277/607 |
| 8,490,353 B2 * | 7/2013 | Beele | F16L 5/10 277/607 |
| 8,541,698 B2 * | 9/2013 | Perschon | H02B 1/305 174/152 G |
| 8,833,014 B2 | 9/2014 | Beele | |
| 2002/0171207 A1 | 11/2002 | Torii | |
| 2004/0045233 A1 | 3/2004 | Beele | |

(56) References Cited

U.S. PATENT DOCUMENTS

| | | | |
|---|---|---|---|
| 2004/0093814 A1* | 5/2004 | Cordts | F16L 5/04 52/220.8 |
| 2004/0093815 A1* | 5/2004 | Cordts | H02G 3/0412 52/232 |
| 2004/0168398 A1 | 9/2004 | Sakno et al. | |
| 2004/0231880 A1* | 11/2004 | Beele | A62C 3/16 174/668 |
| 2005/0179214 A1* | 8/2005 | Beele | F16L 5/04 277/628 |
| 2006/0053710 A1* | 3/2006 | Miller | H02G 3/0412 52/232 |
| 2007/0216110 A1 | 9/2007 | Stuckmann et al. | |
| 2007/0273107 A1 | 11/2007 | Beele | |
| 2008/0088128 A1 | 4/2008 | Staskal | |
| 2009/0130891 A1* | 5/2009 | Milton | H02G 3/22 439/373 |
| 2009/0218451 A1* | 9/2009 | Lundborg | F16L 5/02 248/56 |
| 2009/0315275 A1 | 12/2009 | Beele | |
| 2010/0059941 A1 | 3/2010 | Beele | |
| 2010/0326724 A1* | 12/2010 | Karlsson | F16L 5/08 174/652 |
| 2011/0018210 A1 | 1/2011 | Beele | |
| 2013/0106060 A1 | 5/2013 | Beele | |
| 2013/0161513 A1 | 6/2013 | Beele | |
| 2013/0234405 A1* | 9/2013 | Beele | F16L 5/10 277/606 |
| 2015/0292649 A1 | 10/2015 | Beele | |

FOREIGN PATENT DOCUMENTS

| | | |
|---|---|---|
| CN | 1205068 A | 1/1999 |
| CN | 1286366 A | 3/2001 |
| CN | 1781001 A | 5/2006 |
| CN | 101506565 A | 8/2009 |
| DE | 2 203 370 | 8/1973 |
| DE | 34 43 284 A1 | 5/1986 |
| DE | 92 04 067 U1 | 7/1992 |
| DE | 92 06 312 U1 | 8/1992 |
| DE | 42 25 916 A1 | 2/1994 |
| DE | 200 02 216 U1 | 4/2000 |
| DE | 296 05 883 U1 | 5/2001 |
| DE | 201 03 786 U1 | 8/2001 |
| DE | 100 35 006 C1 | 3/2002 |
| DE | 202004017185 U1 | 3/2006 |
| DE | 102005002597 B3 | 8/2006 |
| DE | 20 2006 017 659 U1 | 8/2007 |
| DE | 20 2009 004 739 U1 | 7/2009 |
| EP | 0 102 876 A2 | 3/1984 |
| EP | 0 139 337 A2 | 5/1985 |
| EP | 0 139 337 A3 | 7/1986 |
| EP | 0 278 544 A1 | 8/1988 |
| EP | 0 795 712 A1 | 9/1997 |
| EP | 0 987 482 A2 | 3/2000 |
| EP | 1 022 834 A1 | 7/2000 |
| EP | 1 059 695 A2 | 12/2000 |
| EP | 1 101 992 A2 | 5/2001 |
| EP | 1 134 472 A2 | 9/2001 |
| EP | 1 617 517 A1 | 1/2006 |
| EP | 1 837 573 A1 | 9/2007 |
| EP | 1 892 448 A1 | 2/2008 |
| EP | 2 390 544 A1 | 11/2011 |
| FR | 2 169 219 | 9/1973 |
| FR | 2 675 879 A1 | 10/1992 |
| GB | 916 461 | 1/1963 |
| GB | 1083451 A | 9/1967 |
| GB | 2 057 595 A | 4/1981 |
| GB | 2 171 139 A | 8/1986 |
| GB | 2 186 442 A | 8/1987 |
| GB | 2 221 736 A | 2/1990 |
| JP | 3-32272 A | 2/1991 |
| JP | H5-41868 A | 2/1993 |
| JP | H6-93372 A | 4/1994 |
| JP | 07-065661 A | 3/1995 |
| JP | 07-245029 A | 9/1995 |
| JP | H7-282894 A | 10/1995 |
| JP | 08-251768 A | 9/1996 |
| JP | 09-327111 A | 12/1997 |
| JP | 2006-514249 A | 4/2006 |
| NL | 1 023 687 C2 | 12/2004 |
| WO | WO 95/27165 A1 | 10/1995 |
| WO | WO 98/15764 A1 | 4/1998 |
| WO | WO 02/43212 A1 | 5/2002 |
| WO | WO 02/052187 A1 | 7/2002 |
| WO | WO 02/070939 A1 | 9/2002 |
| WO | WO 2004/111513 A1 | 12/2004 |
| WO | WO 2005/003615 A1 | 1/2005 |
| WO | WO 2007/028443 A1 | 3/2007 |
| WO | WO 2007/107342 A1 | 9/2007 |
| WO | WO 2007/139506 A1 | 12/2007 |
| WO | WO 2008/023058 A1 | 2/2008 |
| WO | WO 2010/086361 A2 | 8/2010 |
| WO | WO 2011/147490 A1 | 12/2011 |

OTHER PUBLICATIONS

International Preliminary Report on Patentability mailed Sep. 24, 2015 for Application No. PCT/EP2014/052708.

* cited by examiner

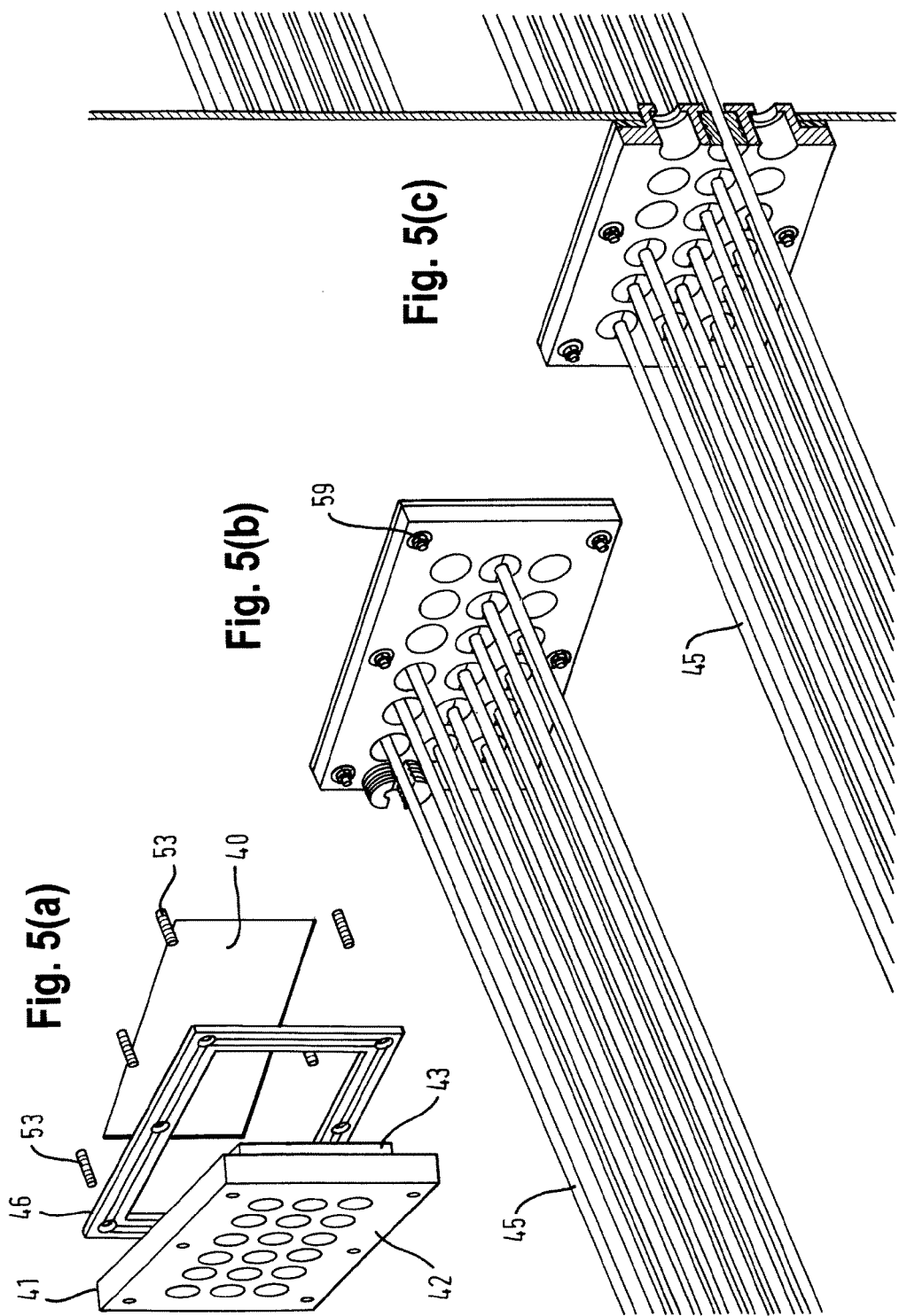

SYSTEM FOR SEALINGLY HOLDING CABLES WHICH EXTEND THROUGH AN OPENING

RELATED CASE INFORMATION

The present application is a national stage filing under 35 U.S.C. §371 of International Application No. PCT/EP2014/052708, filed Feb. 12, 2014, which claims priority to Netherlands Application No. 2010304, filed Feb. 14, 2013. International Application No. PCT/EP2014/052708 is incorporated herein by reference in its entirety.

The invention relates to a system for sealingly holding cables which extend through an opening. Many electrically and/or optically-driven devices, systems and constructions comprise a number of cables extending from one side of a construction element to another side of that construction element via an opening made available in the construction element. Such a construction element could be part of a building, vessel, plane etc., but could also be a housing of, for instance, switch cupboards, transformers, adapters etc. Although the opening conveniently provides a space through which the cables can extend, apart from those cables nothing else should manage to find its way through the opening. This not only applies to dust, but also and particularly to flowable media, such as smoke, water, gases, etc.

Cables are often sensitive to compression in the radial direction. This applies particularly to cables through which optical signals propagate. For this reason, it has not been uncommon to apply a tastable material in an annular space around the cable that extends through an opening. Although this ensures that the sealing will adapt its shape to the space available and not impose its presence onto the cable, a problem is that the cable can often not easily be removed and/or replaced. Such an exercise often requires a complete refurbishment of the opening which can be time-consuming and costly.

Also tightenable constructions have been used. Rubber rings may then be applied around the cables, and as a result of a tightening mechanism, axial pressure ensures that the rubber expands in both radial directions, and thus providing a sealing. The extent to which tightening occurs is often dependent on the worker performing this task. As a consequence, there is a wide span of quality in the sealing.

Furthermore, these tightening systems introduce other problems. Apart from the fact that these systems are difficult to install, time-consuming, costly and require a large inventory control, these systems work unsatisfactorily in the long run. As is well-known, rubber has a natural relaxation, occurring over time. If rubber has not been properly saturated or vulcanized, chemical relaxation can also occur. This enhances the overall relaxation of the rubber. As a consequence, retightening needs to take place relatively frequently.

A further problem is that a change in temperature will, due to thermal expansion or shrinkage, result in loosening or overtightening of the whorls etc., resulting respectively in weakening the sealing and irreversible deformation of the rubber. In particular when cables with plastic sheathings are used, it is possible that the outer surfaces of these cables are subjected to such a radial inward pressure that the outer diameter of the plastic cables over time decrease, due to a phenomenon known as "creep". If this occurs, a further tightening is needed. However, immediately and unavoidably, the sealing will further deteriorate by both physical phenomena, creep and relaxation.

WO 2008/023058 discloses a frame having one or a plurality of conduits which are each suitable for receiving at least one cable and for receiving an elastically slightly deformable plug for sealingly filling the space between an inner circumferential wall of the conduit and the at least one cable. The frame is preferably of steel, or aluminium, but may also be of a hard engineering plastic, such as polyetherimide (PEI) or polyethersulfonamide (PES).

The flange may be suitable for welding the frame against a construction element. However, the frame may also be bolted, preferably using a gasket, to the partitioning construction element. The flange is positioned such that the frame is in its entirety placed on one side of the construction element.

The system of frame and plugs as described in WO 2008/023058 is developed to sustain a sudden very high pressure upon which occurrence the sealing can start acting dynamically. The sealing plug will be compressed in axial direction and expand somewhat in transverse direction. In such a situation, the sealing plug tightens itself further in the annular space between the inner wall of the conduit and the pipe, cable or duct extending through that conduit sleeve. Consequently, the walls of the frame between the various conduit walls are designed to be relatively thick, so as to accommodate for the higher pressures generated by the radial forces exerted on these walls. This has the drawback that per area of opening, relatively few conduits can be placed for constructing sealing transits for pipes, cables or ducts.

There is a need for an alternative system which allows for a relatively large number of cables extending through an opening. Further, as under such circumstances cables will be positioned relatively close to each other, it is also necessary that the cables can be held somewhat tightly without too much slack, so that the cables are not entangled in each other and/or so that the arrangement of cables is visually clear. This is particularly important when certain cables need to be replaced or removed. In other words, there is a need for a system wherein little play in the cables is needed.

The invention provides a system for sealingly holding cables which extend through an opening. The system comprises a holder substantially in the form of a plate having a central portion with a first thickness between a first side and a second side of the plate and a peripheral portion with a second thickness which is smaller than the first thickness. In the central portion the holder has a plurality of conduits extending in the thickness direction of the plate. Each conduit is suitable for having one or more cables extending through the conduit. The system further comprises at least one multi-part sealing plug of an elastic material for sealing an annular space between an inner wall of one of the conduits and a cable extending therethrough. The system further comprises a gasket, of an elastic material, and of a shape for placement against the peripheral portion so as to provide a sealing in a circumferential direction of the plate.

The plug has at least one circumferentially extending outer rib and at least one circumferentially extending inner rib, wherein in uninserted state the following conditions apply:

the outer rib has a sawtooth shape for easy insertion, the sawtooth is provided with an angled inward bend for facilitating flexing of the sawtooth in a transverse direction;

the inner rib has a top surface extending in circumferential and longitudinal direction for facilitating sliding along the cable; and an imaginary straight line extending in a transverse direction coincides with the pivotal point of the angled bend and intersects the top surface.

Such a system allows for sealingly holding cables through an opening and for having little or no play in the cables extending through the opening. When the peripheral portion of the holder is placed in overlap with the surrounding of the opening, sandwiching the gasket between the peripheral portion and that surrounding of the opening, the holder is effectively placed in a sealing fashion. The entire area of the opening is then available for holding cables which pass through. That is, the sealing of the holder and the part used for fixing the holder do not occupy a part of the opening.

The position of the conduits is well defined. The cables can be passed through the respective conduits and pulled straight, so that no or only little slack is present in the cables. Very little play is needed for ensuring that the cables are for each conduit in the centre of the conduit. The plugs can be inserted in the annular space because the outer ribs can flex such that the overall diameter of the plug adopts a smaller dimension corresponding to the inner diameter of the conduit. Then the inner ribs slide along the cable, instead of "grabbing" the cable and then together with an axial motion of the cable be positioned in the conduit. The latter would require more slack in the cable. Thus, for installing the system, very little play is needed in the cables, so that the arrangement of cables has an organized appearance avoiding a messy, or even spaghetti-like entanglement of the cables.

Once a plug is in position, surrounding a cable in a conduit, it is still possible to pull the cable in axial direction for taking any slack out of the cable, or for creating more slack, should this be required. However, within a few minutes the plug will tighten the grip on the cable, essentially by "flexing-back" of the outer ribs, as will be further explained below in the description of the drawing. After this tightening of the grip of the plug, pulling the cable out of the holder will result in removal of the plug from the conduit. The pulling force needs to be high as the resistance generated by the sawtooth needs to be overcome. This will also be discussed in more detail in the description of the drawing. The system is thus easy to install, leaves a neat well-sealed arrangement of cables after installment, and can easily be re-arranged. After placement of the holder, there is no need for tools and for manually tightening rubber sealing parts.

In an embodiment of the system according to the invention, the gasket is of such a combination of hardness and design that in mounted and fixed condition, movement of the holder as a result of elastic deformation of the gasket can be accommodated for by the sealing plug without movement of a cable held by the plug relative to contact surfaces between the cable and the plug. Thus also when the sealing system has been installed, the holder will hardly move relative to the cables. Should any movement of the holder relative to the cables occur, then this will be less than can be accommodated for by the form and elasticity of the sealing plugs. Consequently, again, no extra play needs to be allowed for in the arrangement of the cables. Subtle movements of the holder maintaining the sealing capacity of the gasket, will be dealt with by flexibility of the sealing plugs, for instance by a subtle elastic deformation of these plugs.

In an embodiment of a system according to the invention, the peripheral portion is at least partly flush with the first or second side. This means the central portion of the holder can at least partly be positioned within the opening, as opposed to protrude away from the opening. Advantageously, this also means that the central portion can be somewhat protected by the construction elements and it is even possible that the central portion obtains some additional stiffness from the placement against the construction element surrounding the opening. Thus, the thickness of the central portion of the holder does not need to be enlarged for ensuring extra stiffness in compensation for a loss of stiffness. This, in turn, offers the advantage that the central portion can be dimensioned to only cope with the (little) forces exerted on the holder by the cables extending through the conduits and held by the respective sealing plugs. This means that per holder a large number of cables can be held, as the central portion as much as possible can be dominated by the presence of the conduits. The walls between the conduits can be relatively thin. Thus, many cables can be held by the holder. Then, also the opening can be relatively small, further enhancing the overall stiffness of the entire construction, and reducing a need for slack in the cables.

In an embodiment of a system according to the invention, each of the conduits has at one of the first and second sides an opening for sealingly inserting one of the sealing plugs and at the other one of the first and second sides a conduit opening which is smaller than the entrance-opening. This has the effect that the plugs, once inserted into the conduit via the entrance opening, cannot easily, if at all, be pushed through the conduit and out of the other end of the conduit opening. This means that the plugs do not need to have a flange which can rest against a surrounding of the entrance-opening. As a consequence of that, the conduits can be placed very closely to each other, so that a large number of cables can be passed through a small opening. Furthermore, at very high pressures it is even possible that the dynamic response of the plugs, as described in WO 2008/023058, will also occur in a system according to this embodiment.

In an embodiment of a system according to the invention, the peripheral portion is provided with a plurality of through-holes for facilitating fixation of the holder against another holder or against a construction having the opening through which the cables are to extend. The gasket has through-holes at positions which correspond to positions of the through-holes in the peripheral portion of the plate. This allows for an easy and accurate fixation without using thermally activated processes. No buffer one is required for accommodating thermal stresses which often result from welding. The opening can optimally be used for passing through cables, as no part of the holder, other than the central portion having conduits, needs to occupy the opening.

In an embodiment of a system according to the invention, the second thickness is more than 25% of the first thickness, preferably more than 30% of the first thickness. This ensures that the stiffness around the transition from the peripheral portion to the central portion is relatively large.

Consequently, the density of the conduits can still be high as the weaknesses introduced by the conduits is somewhat compensated for by the other stiffer parts of the holder at the peripheral portion.

In an embodiment of a system according to the invention, each peripheral portion has a width which is in a range of about 3-10% of the total length of the plate. Thus, the stiffness of the entire plate is predominantly due to the thickness of the central portion. The presence of the peripheral portion only marginally affects the stiffness of the central portion, if at all. Hence, the positioning of the conduits and the number of conduits per surface area of the plate, can be optimal, without having to consider possible influences of the thinner peripheral portion on the overall stiffness of the holder.

In an embodiment of a system according to the invention, a peripheral portions have a similar width.

In an embodiment of a system according to the invention, the distance between two conduits is 5 mm or less, preferably, 3 mm or less. This further allows for a large number of conduits per surface area of plate, and thus for a relatively small opening for a large number of cables.

The invention and further embodiments thereof are further explained with the aid of a drawing in which.

Figure 6A:
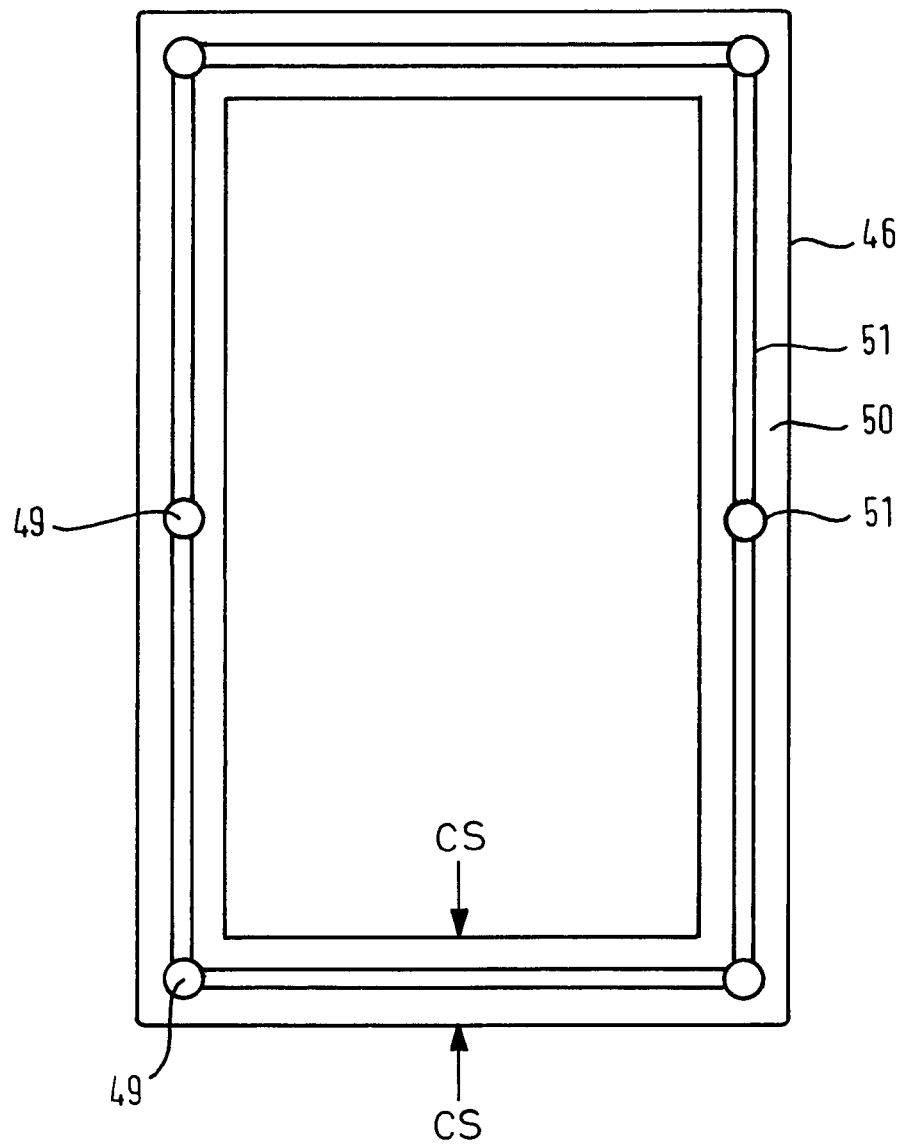
Figure 6B:
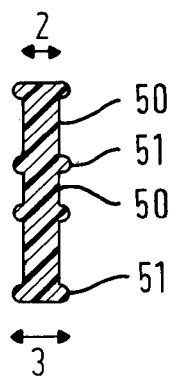
Figure 7A:
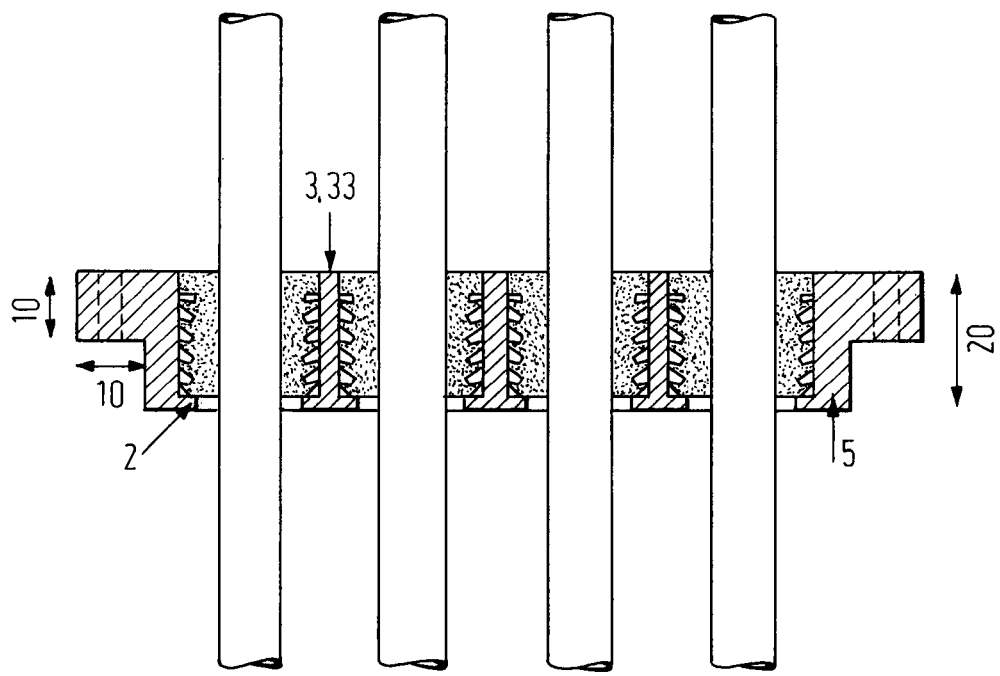
Figure 7B:
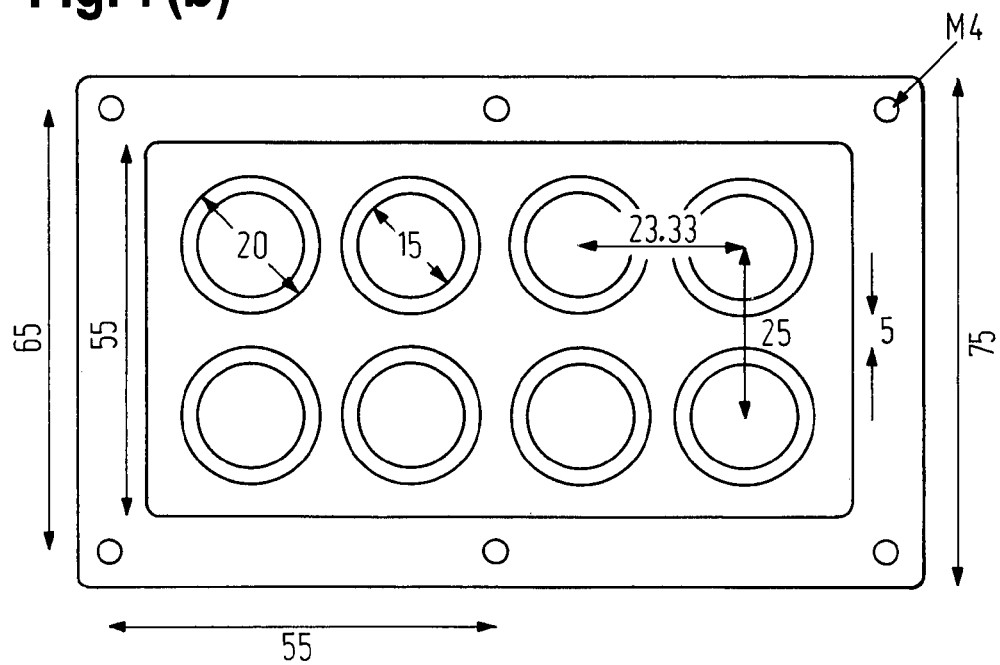
Figure 8A:
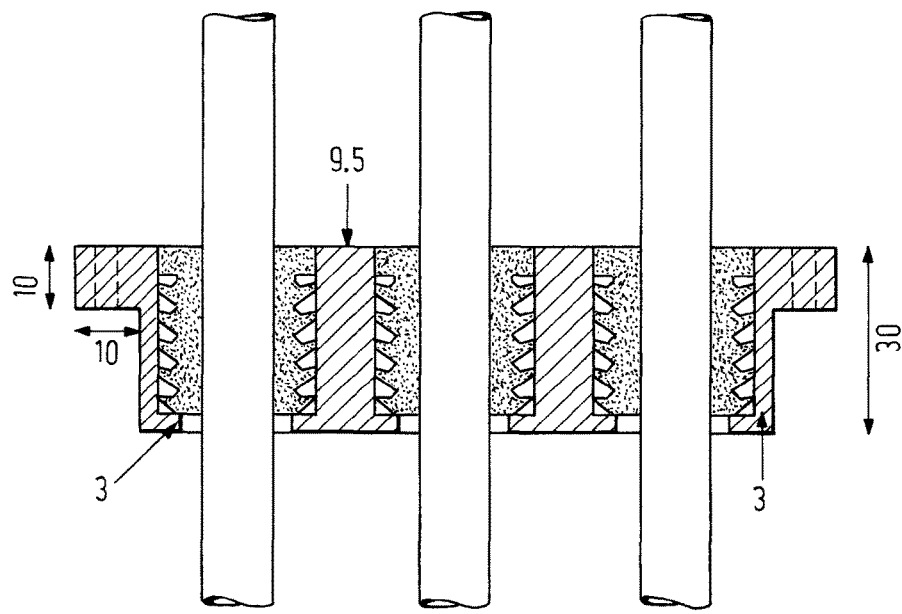
Figure 8B:
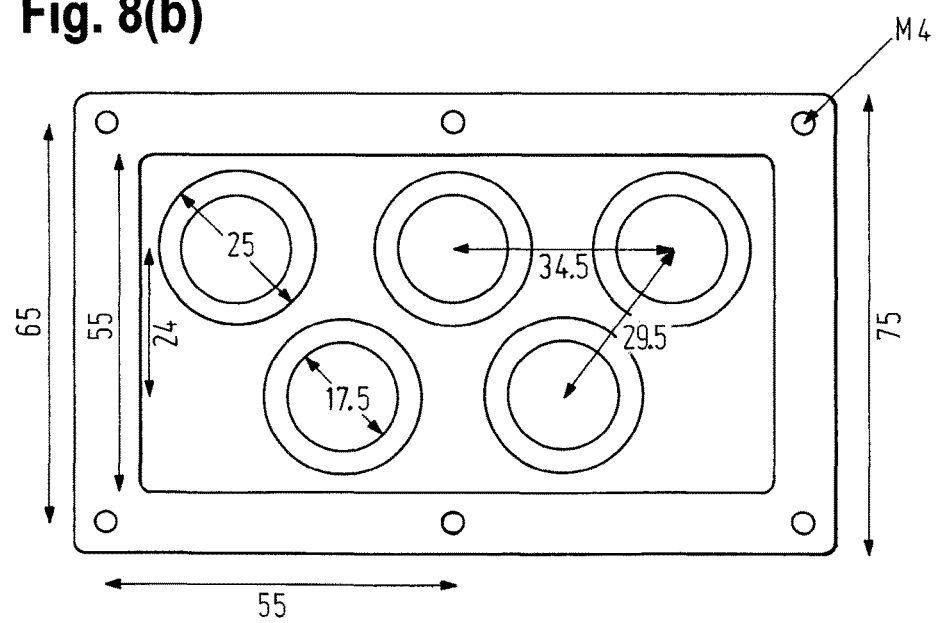
Figure 9A:
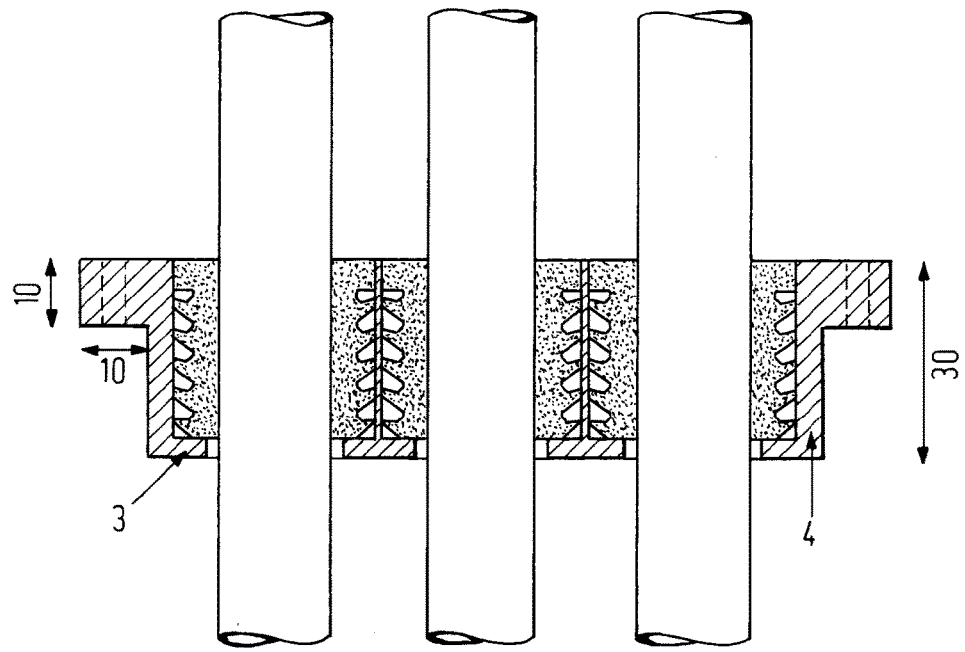
Figure 9B:
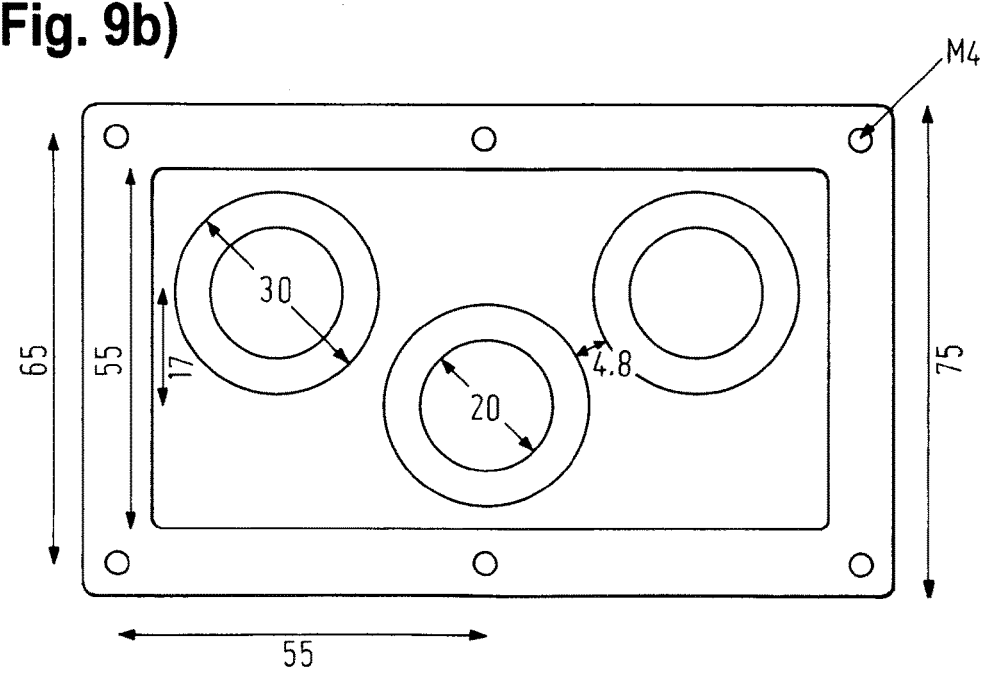
Figure 10A:
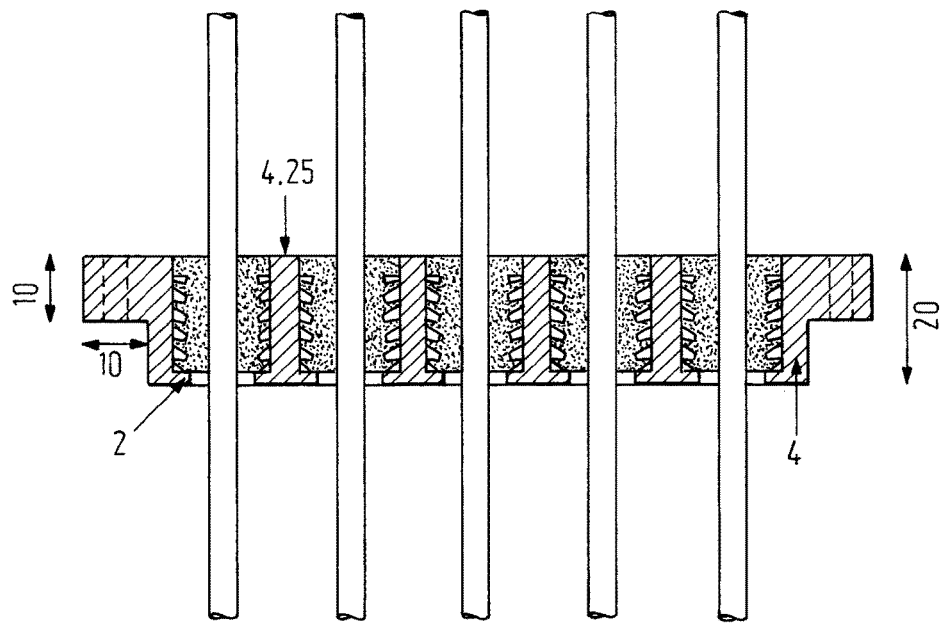
Figure 10B:
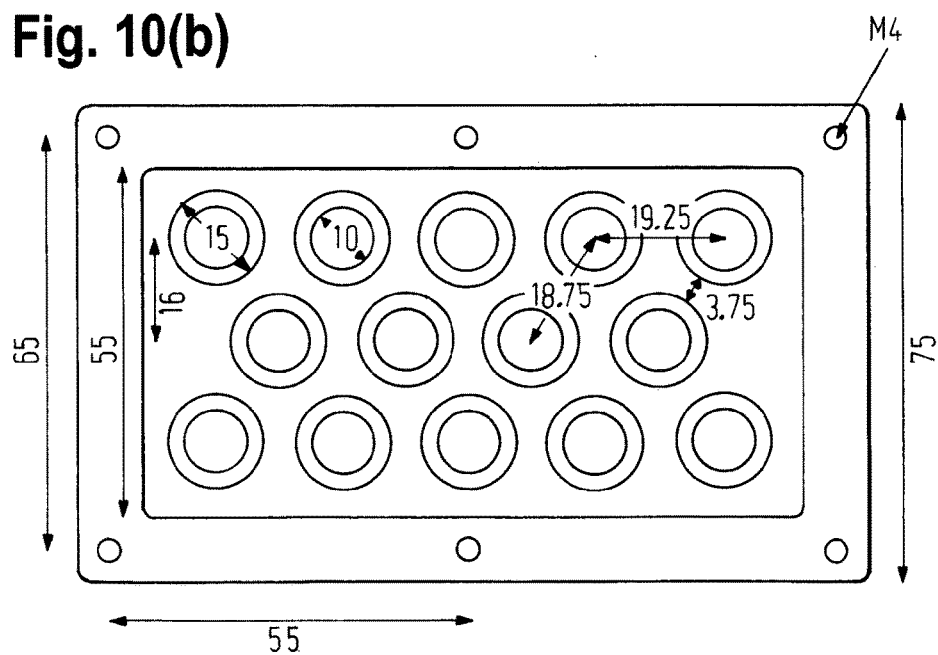
Figure 11A:
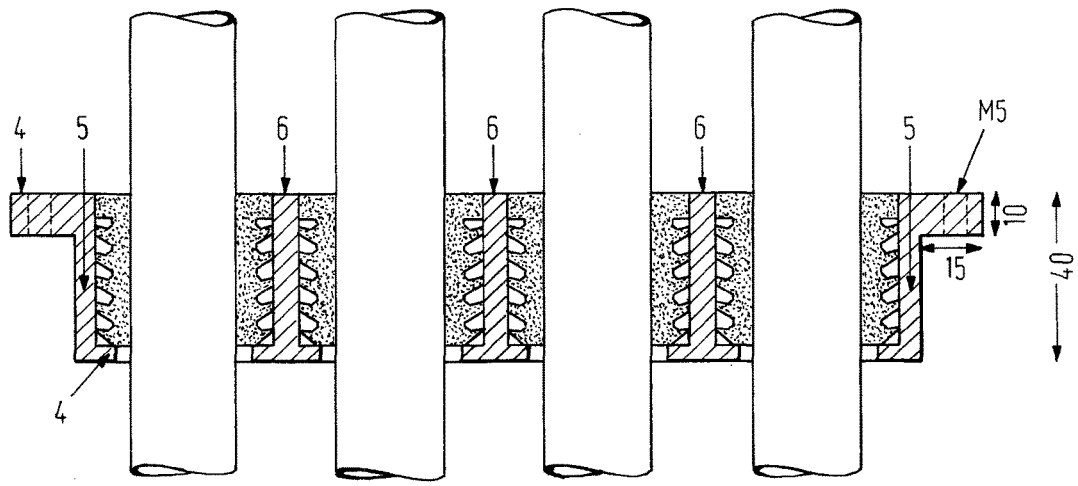
Figure 11B:
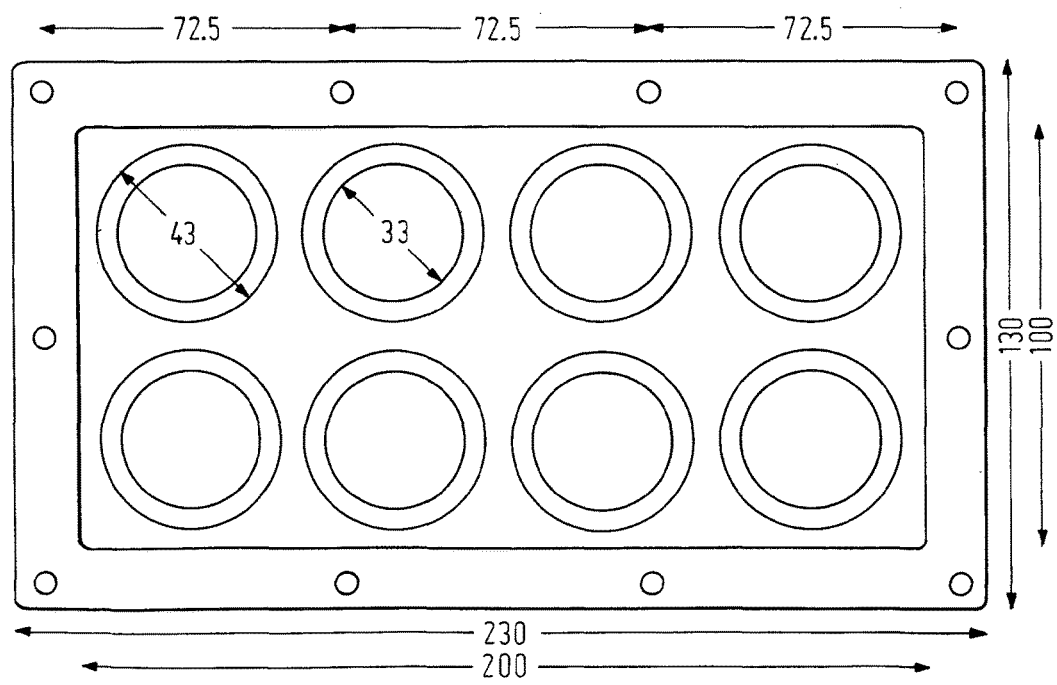
Figure 12A:
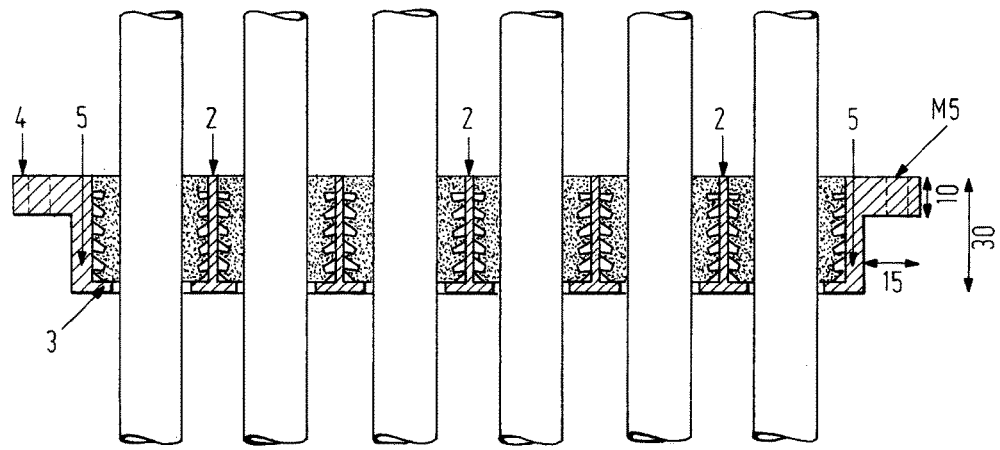
Figure 12B:
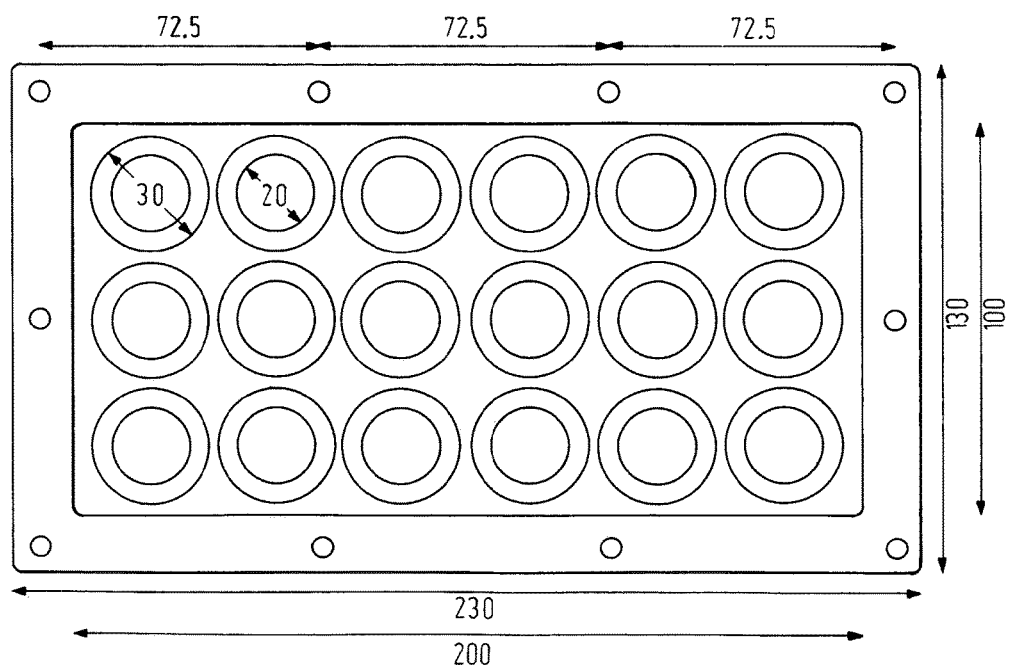
Figure 13A:
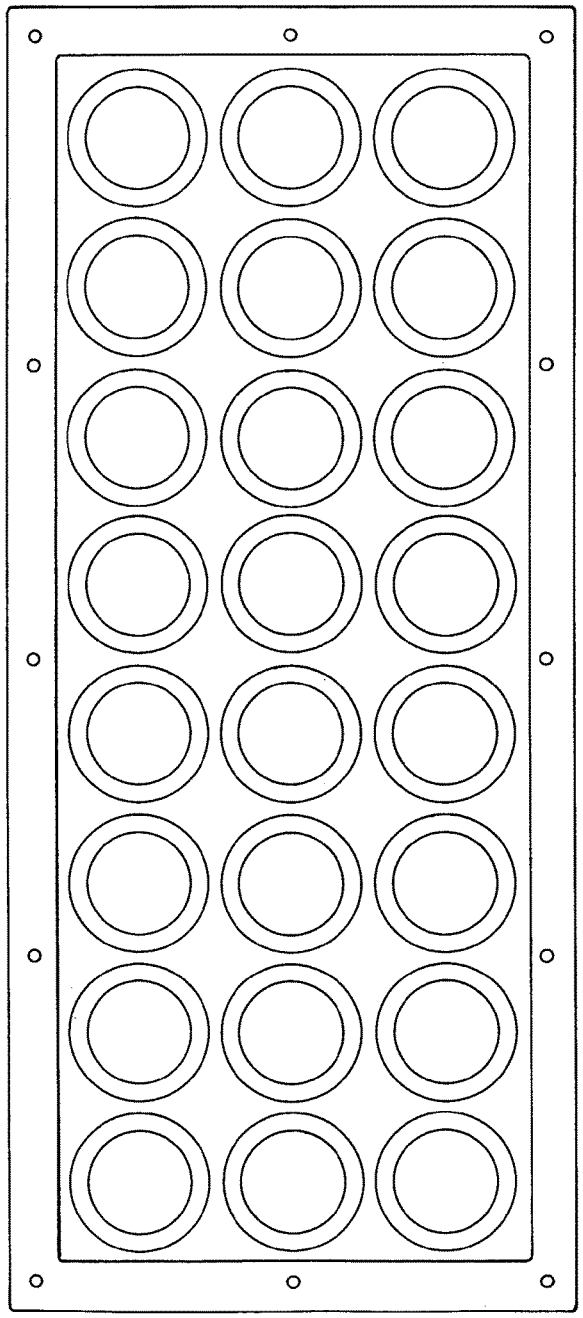
Figure 13B:
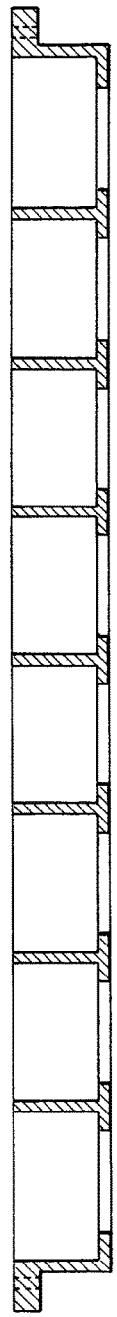

FIG. 5(a)-(c) show in perspective an embodiment of a system according to the invention in three different stages of its use;

FIG. 6(a) shows a top view of a part of an embodiment of the system according to the invention;

FIG. 6(b) shows in cross-sectional view the part indicated by the arrows CS shown in FIG. 6(a);

FIG. 7(a) shows in cross section parts of an embodiment of a system according to the invention, in use;

FIG. 7(b) shows a top view of a part of an embodiment of a system according to the invention;

FIG. 8(a) shows in cross section parts of an embodiment of the system according to the invention, in use;

FIG. 8(b) shows one part of an embodiment of the system according to the invention;

FIG. 9(a) shows in cross section parts of an embodiment of a system according to the invention, in use;

FIG. 9(b) shows a top view of a part of an embodiment of a system according to the invention;

FIG. 10(a) shows in cross section parts of an embodiment of a system according to the invention, in use;

FIG. 10(b) shows a top view of a part of an embodiment of a system according to the invention;

FIG. 11(a) shows in cross section parts of an embodiment of a system according to the invention, in use;

FIG. 11(b) shows a top view of a part of an embodiment of a system according to the invention, FIG. 12(a) shows in cross section parts of a system of an embodiment of a system according to the invention, in use;

FIG. 12(b) shows a top view of a part of an embodiment of a system according to the invention;

FIG. 13(a) shows a top view of a part of an embodiment of a system according to the invention; and FIG. 13(b) shows in cross section the part of which the top view is shown in FIG. 13(a).

In the drawing, like features are referred to by like references.

Figure 1:
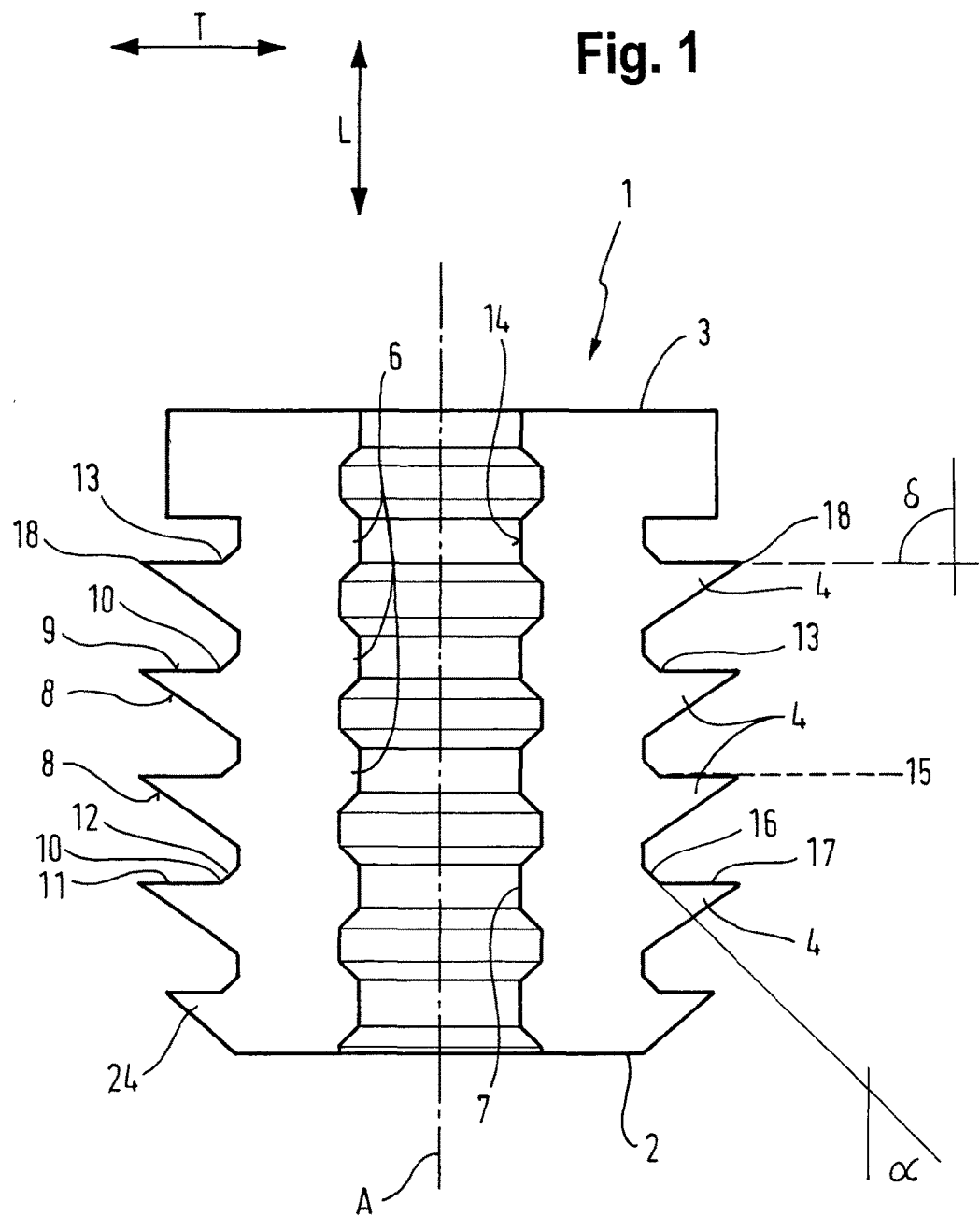
FIG. 1 shows in cross-sectional view a part of an embodiment of a system according to the invention.

FIG. 1 shows in cross-sectional view a part of a first embodiment of a system for sealingly holding cables through an opening.

The system comprises at least one multi-part sealing plug, in this example comprising two segmental parts 1 for forming the sealing plug in an annular space formed between an inner wall of a conduit and a cable. Each segmental part 1 is provided with a small-diameter-end 2 for facilitating insertion of the plug in the annular space. Later on in this description, it will be explained how the small-diameter-end 2 may differ from other parts of the segmental part 1.

Each segmental part 1 is preferably provided with a large-diameter-end 3 for positioning at the end of the tubular opening from which the segmental parts 1 are inserted into the annular space. Each segmental part 1 has at least one but preferably a number of outer ribs 4 spaced apart in a longitudinal direction L. These outer ribs 4 are for realizing, in use outer contact surfaces 5 which extend in a circumferential direction between the sealing plug and the inner wall of the opening (see FIG. 2). Each segmental part 1 is further provided with one or a number of inner ribs 6, also spaced apart in the longitudinal direction L. These inner ribs are for realizing, in use, inner contact surfaces 7 which extend in a circumferential direction between the sealing plug and the tube, cable or duct. At least one of the outer ribs 4 and one of the inner ribs 6 meet in uninserted state of the plug the following geometric condition:

the outer rib 4 has in cross-section the shape of a sawtooth for easy insertion. In this example, the sawtooth has a rising surface 8 rising radially outwardly toward the large-diameter-end 3 of the plug. The sawtooth further has an angled inward bend 10 for facilitating flexing of the sawtooth in a transverse direction. (In this example, the sawtooth has the angled inward bend 10 a falling surface 9 for relative movement of parts 11, 12 of the falling surface 9 on opposite sides of a pivotal point 13 of the angled bend 10);

the inner rib 6 has a top surface 14 extending in circumferential direction and a longitudinal direction L for facilitating sliding along the cable. (In this example, the top surface 14 forms one of the inner contact surfaces 7); and an imaginary straight line (dashed line 15) extending in a transverse direction T both coincides with a pivotal point 13 of the angle bend 10 and intersects the top surface 14.

Preferably, a lower part 16 of the falling surface 9 between the pivotal point 13 and an imaginary central axis A of the plug includes an angle α in a range of 30-60° with the longitudinal direction. Preferably, α is in the range of 40-50°. In a most suitable embodiment, α is 45°. An upper part 17 of the falling surface 9 between the pivotal point 13 and an apex 18 of the sawtooth, includes an angle of δ in the range of 90-70° with the longitudinal direction L. Preferably, lower part 16 of the falling surface 9 has a length which is about 70 percent of the length of the top surface 14 of an inner rib G. As shown in the embodiment of FIG. 1, an imaginary straight line 15 extending in a transverse direction T both coincides with an apex 18 of the sawtooth and intersects the top surface 14. As also shown in the embodiment of FIG. 1, preferably an imaginary straight line 15 extending in a transverse direction T both coincides with an upper part 17 of the falling surface 9 and intersects the top surface 14. As shown, it is possible that the rising surface 8 includes along its entire surface a constant angle in longitudinal direction L.

However, in an alternative embodiment (not shown in the present drawing), a first part of the rising surface 8 adjoining the apex 18 of the sawtooth is provided with a leveling with respect to a second part of the rising surface 8 located further away from the apex 18. The leveling includes an angle γ with the longitudinal direction L that is equal to or greater than 0° and less than an angle θ of the second part 20 with longitudinal direction L. WO 2004/111513 A1 shows in, for instance, FIGS. 1, 5, 6a and 6b, such a leveling, there referred to by reference sign 15. These Figures are as example of this alternative embodiment explicitly incorporated by reference.

In embodiments where such a leveling is applied, a meeting of the leveling and the segment part of the rising surface 8 located further away from the apex 18 forms an angled outward bend 21 located in the rising surface 8. The angled outward bend 21 in the rising surface 8 is located further away from an imaginary central axis A of the plug than the pivotal point 13 of the angled inward bend located in the falling surface 9.

In any embodiment it is preferable that the inner rib 6 is on either side of the top surface 14 further provided with a sloped surface 22 which extends away from the top surface 14. The slope of each sloped surface 22 encloses an angle Φ in a transverse direction T of the segmental part 1 such that bending of the inner rib 6 is substantially inhibited when the segmental part 1 is inserted into the annular space.

As shown, the inner ribs 6 are preferably in the longitudinal direction L positioned at a distance from each other. However, as shown in WO 2007/028443 A1, it is also possible to have the inner ribs adjacent each other.

Figure 2:
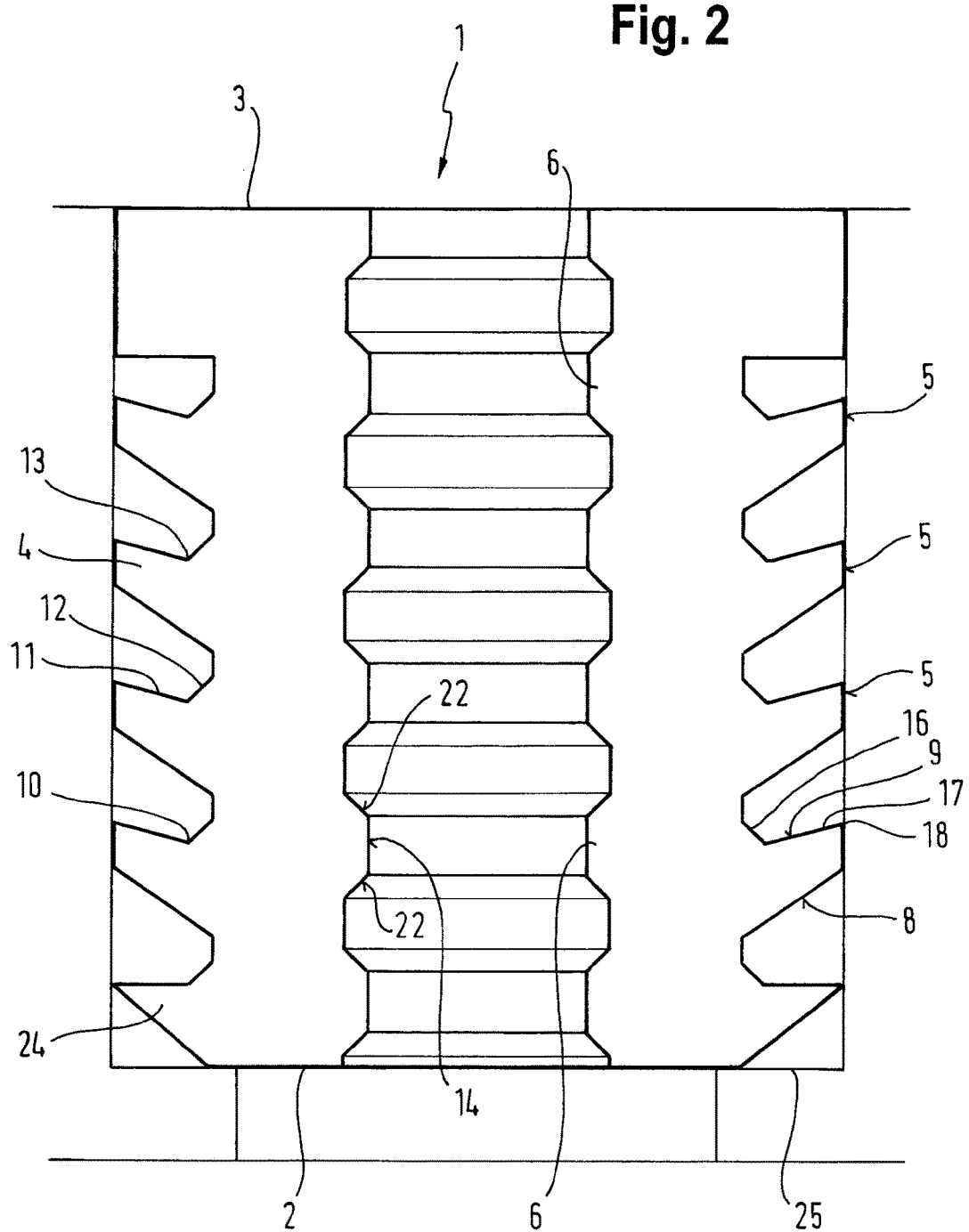
FIG. 2 shows schematically in cross-sectional view a part of the embodiment as shown in FIG. 1, now inserted in a conduit.
Figure 3:
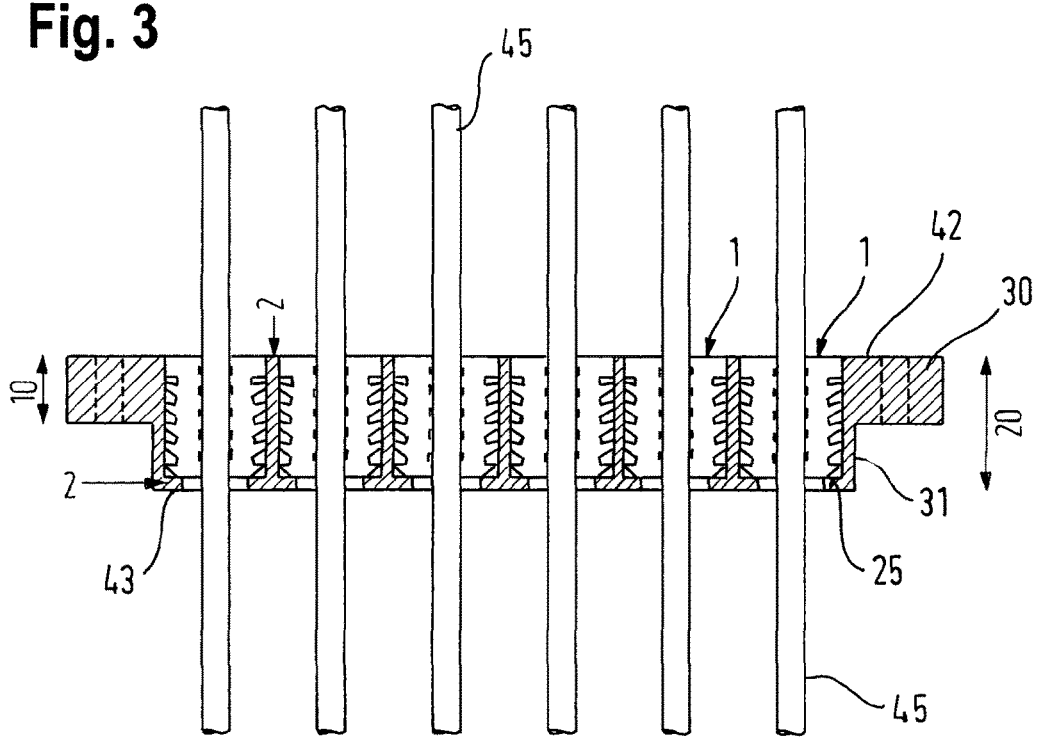
FIG. 3 shows in cross-sectional view a holder with conduits having sealing plugs inserted as a part of an embodiment of a system according to the invention.

As shown in FIGS. 1, 2 and 3, the large-diameter-end 3 is suitable for positioning in the end of the tubular opening. In this embodiment, the diameter of the outer ribs 4 is slightly larger than the diameter of the large-diameter-end 3. The diameter of the large-diameter-end 3 may correspond to the diameter of the inner wall of the tubular opening. For such an embodiment, the flange contributes to the stability of the plug in the opening.

As shown, four of the outer ribs 4 and four of the inner ribs 6 meet in uninserted state of the plug the geometric condition specified above. Although the effect can already be achieved by application of the condition for one outer rib 4 and one inner rib 6, the overall sealing can be improved if this effect can be achieved at various positions along the longitudinal direction of the plug.

As also shown, particularly in FIGS. 1, 2 and 3, the first outer rib 24 at the small-diameter-end 2 has a smaller diameter than the other outer ribs 4. This diameter of the first outer rib 24 may deliberately be made only a tiny bit larger than the diameter of the inner wall of the tubular opening. This facilitates an initial stage of insertion of the segmental part 1 as part of the plug. The first outer rib 24 can then easily be inserted and still contribute a little to the stability of the plug after insertion. Once the first outer rib 24 has been inserted, the remaining part of the plug can more easily be inserted when relatively large forces are applied in the longitudinal direction onto the large-diameter-end 3

Segmental parts can be manufactured by molding a vulcanizable polymer material under such conditions so that vulcanization takes place. Ideally, the materials and the processing thereof is such that a rubber having a Shore A hardness of 70-74° is produced in the form of the segmental part. These processes can easily be controlled by those skilled in the art.

As shown in FIGS. 2 and 3, the segmental parts 1 can upon insertion in the tubular opening be placed against a shoulder 25 positioned in the tubular opening. The shoulder not only prevents the plug from being pressed out at the end of the opening opposite the end at which insertion took place, it also allows for a dynamic response of the plug in a situation where high pressure is applied against the large-diameter-end 3 of the plug. This dynamic effect is further described in WO 2008/023058 A1 as well as in WO 2007/107342.

Figure 4:
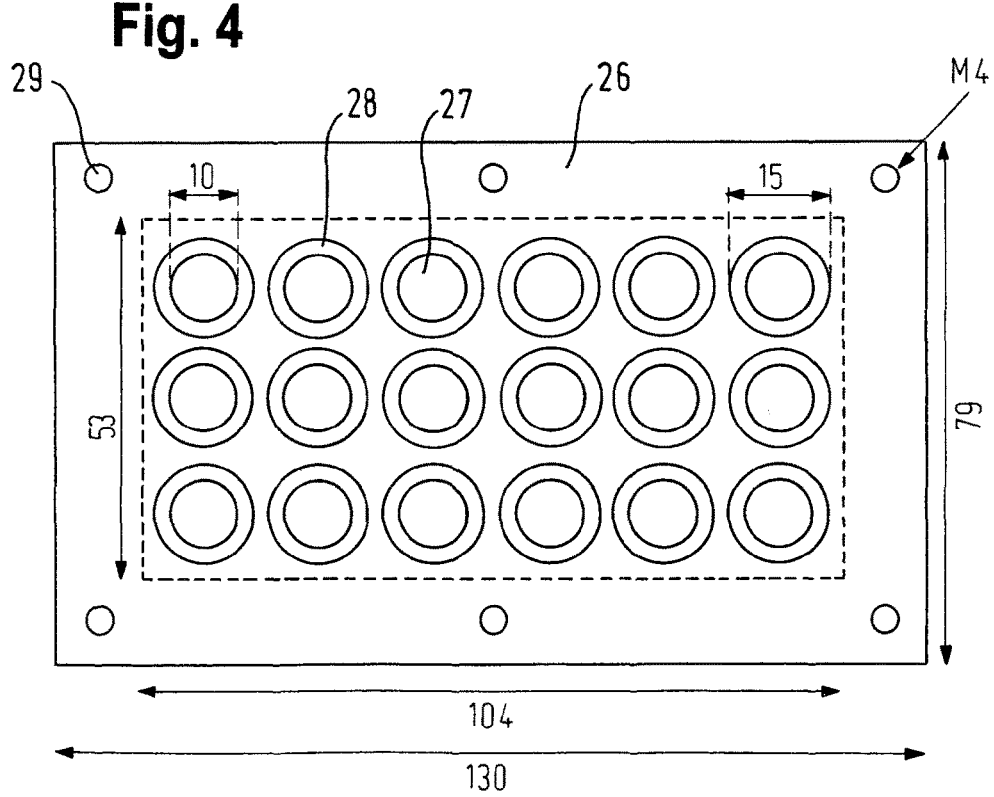
FIG. 4 shows a top view of the holder shown in FIG. 3.

It has turned out that the plugs as shown in the drawing operate very well for building a water-tight transit of electric cables. The plugs are easily inserted in the tubular opening as for instance shown in FIGS. 2, 3 and 4. The tightness of both the plug and the electric cables improves within the first 24 hours after forming the sealing system in the tubular opening around the electric cable. The sealing system can very easily be applied. Only the frame needs to be fixed, possibly by screws.

Having now described multi-part sealing plugs as part of a system according to the invention, attention is now drawn to FIGS. 5(a)-(c) for describing in more detail other parts of an embodiment according to the invention and for explaining how installation of such an embodiment works.

FIG. 5(a) shows as part of a system for sealing the holding cables through an opening 40, a holder 41 substantially in the form of a plate. The plate has a central portion 31 with a first thickness between a first side 42 and a second side 43 of the plate. The plate further has a peripheral portion 30 with a second thickness which is smaller than the first thickness. The holder 41 has in the central portion 44 a plurality of conduits 27 which extend in the thickness direction of the plate. Each conduit 27 is suitable for having one or more cables 45 extending therethrough.

A further part of a system according to the invention comprises a gasket, of an elastic material and of a shape for placement against the peripheral portion 30 so as to provide a sealing in a circumferential direction of the plate.

FIG. 6(a) shows in more detail a top view of an embodiment of such a gasket 46. FIG. 6(b) shows a cross section of gasket 46 taken along the arrows CS shown in FIG. 6(a).

Before describing in more detail the gasket 46, the description will now focus in more detail on an embodiment of holder 41. As indicated, the holder comprises a plurality of conduits 27. As is clear from FIG. 5(b), each of these conduits 27 is suitable for receiving cables, pipes or ducts. Although the drawing show each time that only one cable, pipe or duct is received by one conduit 27, it is of course also possible that two cables, pipes or ducts are received in one conduit 27. A multi-part sealing plug adapted for filling in the remaining space in the conduit 27 is known in the art, and can be presented in FIG. 12 of WO 2007/107342. Each of the conduits 27 is thus also suitable for receiving such an elastically deformable plug for sealingly filling space that is surrounded by the inner circumferential wall of the conduit and that is not occupied by a cable, pipe or duct, or a plurality thereof.

As shown in the figures of the drawing which show the holder, the peripheral portion 30 is preferably flush with the first side 42. It is also possible that the peripheral portion is flush with the second side 43 of the holder 41. Each of the conduits 27 has at first side 42 an entrance opening 47 for sealingly inserting one of the sealing plugs 1. The conduits 2 have at the second side 43 a conduit opening 48 which is smaller than the entrance opening 47. Of course, this can also be the other way around, namely, that the smaller entrance opening 47 is at the second side 43 and the larger conduit opening 48 is at the first side 42. Clearly, towards one side of the holder 41, the conduits 27 are narrower than at the other side of the holder 41. A decrease of diameter in each conduit 27 results, effectively, in a blocking element, shoulder 28, which hinders in each conduit movement of one end of a sealing plug 1 inserted in that conduit 27. The blocking element is essentially a ring-shaped element. It is an integral part of the holder 41.

The peripheral portion 30 could also be referred to as a flange. The peripheral portion 30 is provided with a plurality of through-holes 29 for facilitating fixation of the holder 41 against another holder 4 against the construction having the opening 40 through which the cables 45 extend. The gasket 46 has through-holes 49 at positions which correspond to positions of the through-holes 49 in the peripheral portion 30 of the holder 41. The holder is preferably made of a hard engineering plastic such as polyetherimide (PEI) or polyethersulfonamide (PES) or High Modulus Polyethylene (HMPE).

The gasket 46 is normally also made of an elastic material and is preferably of such a combination of hardness and design that in mounted and fixed condition, movement of the holder 41 as the result of the elastic deformation of the gasket 46 can be accommodated for by the sealing plug 1 without movement of a cable 45 held by the plug 1 relative to contact surfaces between the cable 45 and that plug 1. The gasket 46 preferably has a maximum thickness of 6 mm, even more preferably a maximum thickness of 3 mm. The gasket 46 has areas of minimum thickness 50 and areas of maximum thickness 51. The areas of maximum thickness 51 surround the areas of minimum thickness 50, so that in use when the gasket is sandwiched between a partition surrounding the opening 40 and the peripheral portion 30 of the holder 41, air pockets are formed on both sides of the gasket. Such air pockets can resist over-tightening of the nuts when bolting the gasket 46, and the holder 41, against the partition surrounding the opening 40. The transition between the areas of minimum thickness 50 and the areas of maximum thickness 51 is preferably stepwise.

FIG. 5(a) shows the first step of the installation of an embodiment of a system according to the invention. The gasket 46 is placed around the opening 40 by sliding the through-holes 49 in axial direction of the bolts 53 toward the partition surrounding the opening 40. Similarly, the holder 41 is positioned such that the peripheral portion 30 is placed against the gasket 46 and the bolts also extend through the through-holes 29 of the holder 41. As shown in FIG. 5(b), by means of nuts 54, the holder 41 can then tightly be positioned against the partition surrounding opening 40, therewith sandwiching gasket 46 which forms a sealing between the partition and the holder 41. Cables 45 can then be pulled through each of the conduits 27. Multi-part sealing plugs 1 can then be inserted in the space remaining in conduit 27 for sealingly holding cable 45 in the respective conduit 27. FIG. 5(c) shows the end result both in perspective and in cross-section.

FIG. 7(a)-FIG. 12(a) show in cross-section various embodiments of a system according to the invention (without showing the gasket). FIG. 7(b)-FIG. 12(b) show the respective top views of the holders. The dimensions provided in these figures are examples. In general though, the thickness of the peripheral portion 32, i.e. the second thickness, is preferably more than 25% of the thickness of the central portion, i.e. the first thickness. Even more preferable is that the second thickness is more than 30% of the first thickness. The peripheral portions 32 have ideally a width which is in a range of about 3-10% of a total length of the plate-shaped holder 41. Preferably, all peripheral portions of a holder have a similar width. Most strikingly, a distance between two conduits 27 is preferably 5 mm or less. In certain embodiments it is even possible that this distance is 3 mm or less.

As shown in the various figures, the arrangement of the conduits relative to each other can be in the form of a "column and row" pattern or in a more "densely packed" pattern, wherein the conduits 27 of a row are in row position between the conduits 27 of the previous row. To keep the number of uniform parts to a minimum, and thus the production costs relatively low, it is preferable to have the holders 41 such that the peripheral portions 32 of these holders 41 are identical. In those circumstances, it is possible to have only one type of gasket suitable for each of these holders 41. These holders can have their conduits 27 differently distributed over the central portion of the holder and, although not shown, can also have different sizes of conduits within one central portion of a holder 41.

In principle though, it is possible to have much larger holders 41, such as for instance shown in FIGS. 14(a) and (b) to accommodate for sealingly holding a large number of cables extending through an opening.

The invention is not limited to the examples shown above. Although each of the holders shown is rectangular, holders may also have differently shaped plate-like dimensions. Consequently, also the gaskets may have differently shaped dimensions, corresponding to the peripheral portions of the respective holders. Although the length of each conduit is preferably suitable for receiving a single plug 1 in its entirety, it is also possible that the length is suitable for receiving two plugs, neighbouring each other in axial direction. It is further possible that each conduit is provided with a blocking element positioned such that on either side of the blocking element the conduit has a length which is suitable for receiving a plug in its entirety. The holders are preferably machined out of a single block of material, however, also molding techniques are not excluded. As already mentioned, sealing plugs allowing for a plurality of cables extending through a single conduit may also be employed. It should further be borne in mind that the system may also be provided with at least one blind plug for sealingly filling a conduit sleeve which is at least temporarily free from having cables, pipes or ducts extending therethrough. Such a blind plug is presented in FIG. 13 of WO 2007/107342.

Further, the plate-shaped holder may also have a varying thickness over the central portion of the plate. The conduits do not necessarily all have the same diameter, or all the same length. The plate-shaped holder may also be part of a transit system or of a cover.

These embodiments are each understood to fall within the framework of the invention.

The invention claimed is:

1. System for sealingly holding one or more cables through an opening, the system comprising:
    a holder substantially in the form of a plate having a central portion with a first thickness between a first side and a second side of the plate and a peripheral portion with a second thickness which is smaller than the first thickness, the holder having in the central portion a plurality of conduits extending in the thickness direction of the plate, each of the plurality of conduits for having one or more cables extending there through;
    at least one multi-part sealing plug of an elastic material for sealing an annular space of the opening between an inner wall of one of the plurality of conduits and one or more cables extending there through, the plug having an axis running in a longitudinal direction;
    a gasket, of an elastic material and of a shape for placement against the peripheral portion so as to provide a seal;
    wherein the plug has at least one outer rib extending circumferentially around the axis and at least one inner rib extending circumferentially around the axis, wherein in an uninserted state;
    the outer rib has a sawtooth shape for easy insertion, the sawtooth is provided with an angled inward bend for facilitating flexing of the sawtooth in a transverse direction that is perpendicular to the longitudinal direction; and the inner rib has a top surface extending circumferentially around the axis and extending in the longitudinal direction for facilitating sliding along the one or more cables.

2. The system according to claim 1, wherein the gasket is of such a combination of hardness and design that in mounted and fixed condition, movement of the holder as a result of elastic deformation of the gasket can be accommodated for by the sealing plug without movement of a cable held by the plug relative to contact surfaces between the cable and the plug.

3. The system according to claim 1, wherein the peripheral portion is at least partly flush with the first or the second side.

4. The system according to claim 1, wherein each of the plurality of conduits has at one of the first and second sides an entrance-opening for sealingly inserting one of the sealing plugs and at the other one of the first and second sides a conduit-opening which is smaller than the entrance-opening.

5. The system according to claim 1, wherein the peripheral portion is provided with a plurality of through-holes for facilitating fixation of the holder against another holder or against a construction having the opening through which the one or more cables extend, and wherein the gasket has through-holes at positions which correspond to the positions of the through-holes in the peripheral portion of the plate.

6. The system according to claim 1, wherein the second thickness is more than 25% of the first thickness, preferably more than 30% of the first thickness.

7. The system according to claim 1, wherein each peripheral portion has a width which is in a range of about 3-10% of a total length of the plate.

8. The system according to claim 1, wherein the peripheral portion has a uniform width.

9. The system according to claim 1, wherein a distance between two conduits is 5 mm or less, preferably 3 mm or less.

10. The system according to claim 1, wherein the gasket has a maximum thickness of 6 mm, preferably a maximum thickness of 3 mm.

11. The system according to claim 1, wherein the gasket has areas of minimum thickness and areas of maximum thickness, wherein the areas of maximum thickness surround the areas of minimum thickness.

12. The system according to claim 11, wherein a transition between the areas of minimum thickness and the areas of maximum thickness is stepwise.

13. The system according to claim 1, wherein the holder is of a hard engineering plastic material, such as HMPE.

14. The system according to claim 1, wherein the axis is a central axis.

15. The system according to claim 1, wherein the outer rib extends circumferentially about the axis, the inner rib extends circumferentially about the axis and the top surface extends circumferentially about the axis.

16. The system according to claim 1, wherein a pivotal point of the angled inward bend is aligned with the top surface of the inner rib in the transverse direction.

\* \* \* \* \*